United States Patent [19]

Gibson

[11] 4,328,983
[45] May 11, 1982

[54] POSITIVE SEAL STEEL COUPLING APPARATUS AND METHOD THEREFOR

[76] Inventor: Jack E. Gibson, 4905 Pepperidge Pl., Odessa, Tex. 79761

[21] Appl. No.: 48,780

[22] Filed: Jun. 15, 1979

[51] Int. Cl.³ .............................................. F16L 19/00
[52] U.S. Cl. .................................... 285/382; 285/383; 285/369; 285/DIG. 16; 29/525
[58] Field of Search ......... 285/382, 40, 202, DIG. 16, 285/369; 29/525; 403/282

[56] References Cited

U.S. PATENT DOCUMENTS

| | | | |
|---|---|---|---|
| 2,147,343 | 2/1939 | Hokanson | 29/525 |
| 2,802,044 | 8/1957 | Corne | 29/525 X |
| 3,133,344 | 5/1964 | Keasler | 29/525 X |
| 3,451,119 | 6/1969 | Coberly et al. | 29/525 X |
| 4,095,825 | 6/1978 | Butler | 285/DIG. 16 |
| 4,124,232 | 11/1978 | Ahlstone | 29/525 |
| 4,156,793 | 5/1979 | Carlson | 29/525 |

FOREIGN PATENT DOCUMENTS 1288648 9/1972 United Kingdom ....... 285/DIG. 16

Primary Examiner—Dave W. Arola
Attorney, Agent, or Firm—Marcus L. Bates

[57] ABSTRACT

Method and apparatus by which joints of seamless pipe are rapidly and economically fabricated into a fluid conveying pipeline. Steel tubular fluid conducting members in the form of pipe joints are joined together by a steel coupler sleeve. The sleeve has opposed cavities which receive adjacent marginal ends of the members. Each marginal end of the pipe is forced into one cavity of the sleeve with great force such that the sleeve cavity holds the pipe ends together with a strong friction fit. A sealing substance is applied to the marginal ends of the pipe. A special hydraulic machine engages and forces the marginal ends of the pipe into the sleeve cavities with a twisting motion, which enhances the connection effected between the sleeve and the marginal end of the pipe.

5 Claims, 5 Drawing Figures

POSITIVE SEAL STEEL COUPLING APPARATUS AND METHOD THEREFOR

BACKGROUND OF THE INVENTION

This invention relates primarily to oilfield pipelines, although it is not limited to this particular field. Most oilfield pipelines employ tubular members constructed of steel and are known as seamless pressure tubing, line pipe, or standard tubing. There are many different ways in which the tubular members are joined to one another to effect a continuous fluid conducting pipeline of limitless length.

it is common to join tubular members by threadedly connecting the ends together by employment of tapered threaded connections which rely upon friction for a sealed fit. Repeated expansion and contraction of the pipeline has a deleterious effect upon this method of construction and ultimately causes the threads to stretch until leakage occurs at the threaded connections.

For this reason, there is another widely used method of connecting tubular members together by the joining of two beveled opposed ends of pipe joints in a butt welded manner. However, the cost of labor and equipment required for this method is enormous.

Still others have proposed joining lengths of steel tubular goods together by a number of different means, including the employment of grooved ends having gaskets and bolted couplers; the use of crimping tools; the application of interlocking tabs; as well as the use of o-rings and compression rings.

For example, Veitch, U.S. Pat. No. 2,498,831 connects plastic pipe together with a coupling member, and uses an adhesive as a sealing means between the marginal pipe end and the coupling member.

Reesor, U.S. Pat. No. 3,343,252 joins conduit together by employment of a knurling process with an interlocking crimping process.

Curtin, U.S. Pat. No. 3,971,574 teaches that plastic pipe may be joined with a smooth fitted coupler, and includes an outside locking coupler.

Kyle et al U.S. Pat. Nos. 1,919,734; Carter 4,014,568, Bartholomew 3,997,195; Streit 4,002,358; Lowe 4,026,584; Asano 4,043,574; Martinez 4,076,285; Ramm 3,633,943; McGuire 3,701,548; Bingham 3,807,776; Frey 4,067,534; Wise 3,843,169; Garrett 3,565,468; and Singer 2,967,067 are other examples of the multitude of approaches to the problem of forming a continuous fluid conveying conduit from a plurality of pipe joints.

The present invention constitutes a step forward over the above prior art by providing a fast, reliable, and inexpensive method and apparatus by which tubular goods are connected together into a continuous fluid conveying pipeline.

SUMMARY OF THE INVENTION

This invention relates to pipeline construction, and specifically to a method of joining pipe joints to a pipe connector or sleeve to provide a new and unusual pipeline. A pair of pipe joints are arranged in spaced relationship respective to one another. The sleeve which joins the marginal ends of the adjacent pipe joints has a pipe receiving socket formed in the opposed marginal ends thereof.

Each socket of the sleeve is divided into a smooth pipe receiving portion and a grooved pipe receiving portion. The adjacent marginal ends of the pipe joints are forced through the smooth and grooved portions of the sockets, and towards one another, as the grooves deform the metal on the outer peripheral wall surface of the marginal ends of the pipe joints, thereby providing a strong mechanical connection.

In the preferred embodiment of the invention, the grooves are located externally of the smooth bore, and the smooth bore receives the marginal terminal end of a pipe joint with a friction fit. A sealant, such as epoxy resin, for example, is applied to the interface between the marginal end of the pipe joint and the interior wall surface which forms the socket. As the adjacent pipe ends are forced into the sockets of a sleeve, the pipe is twisted respective to the sleeve, or rotated about the longitudinal axial centerline thereof, thereby more evenly distributing the sealant and more firmly setting the grooves of the sleeve into the outer surface of the pipe joint.

Accordingly, a primary object of the present invention is the provision of a method by which pipe joints are joined together in the field by axially moving a pair of pipe joints towards one another and into a sleeve which frictionally engages the marginal ends of the pipe joints.

Another object of the present invention is the provision of a method of connecting adjacent ends of a pipe joint by frictionally engaging the marginal ends of the pipe within a sleeve.

A further object of this invention is the provision of a method and apparatus by which pipe joints are joined together by forcing the marginal ends thereof into a sleeve, where a sealant and high friction forces hold the pipe joints within the sleeve.

A still further object of this invention is the provision of a method of connecting the marginal ends of pipe joints together by forming a socket on one marginal end of a pipe joint and forcing another pipe end into the socket so that the pipe joints are held together by friction.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described in the above abstract and summary.

DETAILED DESCRIPTION OF THE PREFERRED EMBODIMENT

Figure 1:
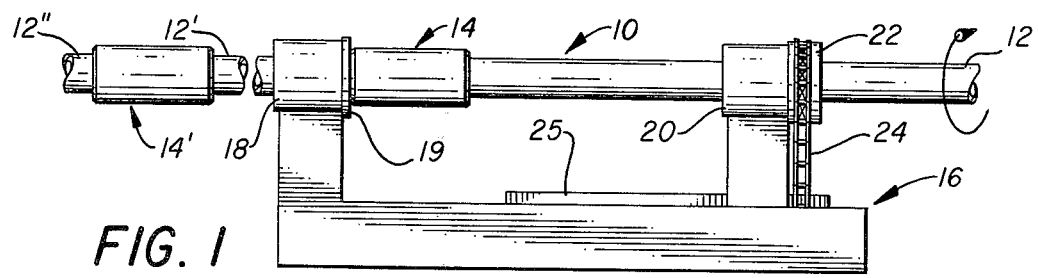
FIG. 1 is a side elevational view of a pipeline undergoing fabrication.

FIG. 1 of the drawing discloses a pipeline 10 undergoing fabrication. The pipeline is comprised of seamless joints of pipe 12 arranged in series relationship respective to one another, with the adjacent facing marginal ends thereof being joined together by a coupling member 14, hereinafter called a sleeve.

Apparatus 16, which can take on several different forms, engages adjacent pipe joints at 18 and 20 and forces the adjacent joints toward one another and into the sleeve 14, as will be described in greater detail later on in this disclosure.

The apparatus 16 includes slips 19 and 22 which engage the outer peripheral surface of the pipe joint with great force, so that member 20 can be moved toward member 18 with great force, usually by employment of hydraulically actuated cylinders and the like. Chain drive apparatus 24 rotates slip member 22 respective to slip member 19 as members 18 and 20 are moved relative to one another, thereby rotating one pipe joint respective to an adjacent joint as the joints are being made up.

Figure 2:
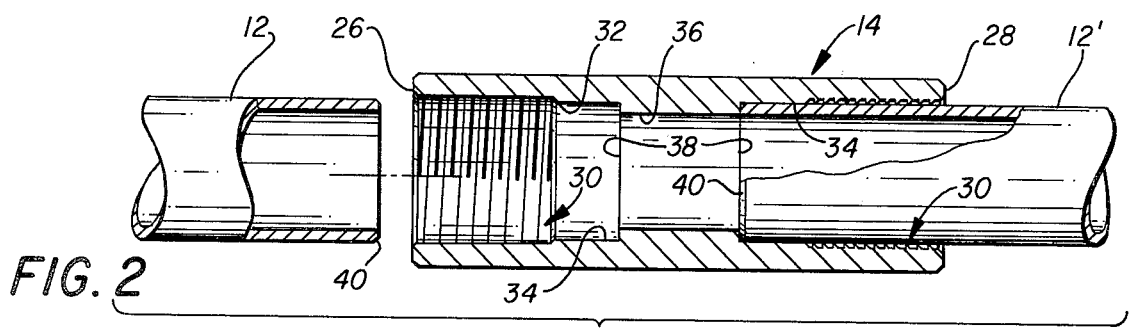
FIG. 2 is a disassembled, enlarged, fragmented, cross-sectional view of part of the apparatus disclosed in FIG. 1.

FIG. 2 discloses in greater detail the before mentioned coupling member 14, made in accordance with the present invention. As illustrated, coupling member 14 has already been joined to the marginal end of pipe joint 12', while pipe joint 12 is yet to be joined to the coupling member.

The sleeve 14 includes outwardly opening sockets which terminate at each end 26 and 28 thereof. A marginal length of the socket is grooved as indicated by the arrow at numeral 30. The grooves preferably are continuous and are comprised of a multiplicity of spaced apart circumferentially extending endless grooves, although the groove can have a beginning and an end which extends from end 26 into proximity of shoulder 32. The grooves 30 constitute a first diameter portion of the socket. A marginal length 34 of the socket is smooth and of constant diameter, and extends from grooves 30 to the reduced diameter portion 36 of the sleeve. Shoulder 38 is formed between diameters 34 and 36.

The terminal ends of each pipe joint are beveled as noted by the arrow at numeral 40. The pipe usually is beveled during fabrication of the individual joints.

Figure 4:
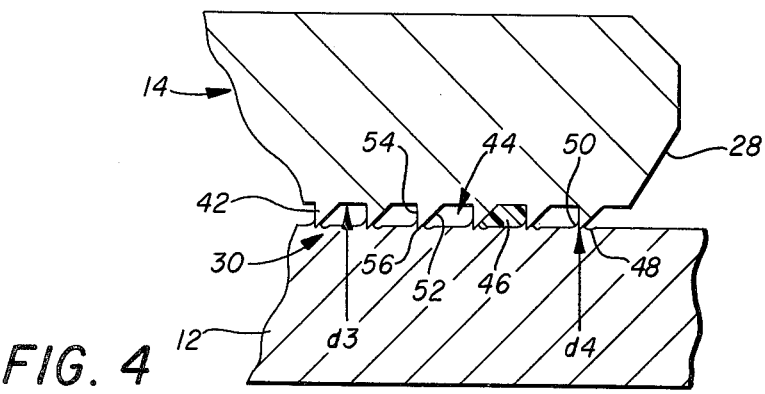
FIG. 4 is an enlarged, fragmented, cross-sectional view of part of the apparatus disclosed in FIG. 3; and, FIG. 5 is a part cross-sectional view of an alternate embodiment of the present invention.

As illustrated in FIG. 4, together with the other figures of the drawings, the circumferentially extending grooves 30 are comprised of a plurality of spaced apart, individual, circumferentially extending cutter blades 42. The marginal ends 56 of the blades are embedded into the outer pipe surface, with the remainder of the cutters forming a plurality of annular areas 44 which may contain a sealant 46, such as epoxy resin, G. E. Silicone Sealer; Loctite #RC680,620, and 601; retaining compounds; Loctite Super Bonder #495,416,430; and the like.

The cutting surface of the individual cutter blades of the groove engage the outer peripheral surface of the pipe and deforms the metal thereof in the manner illustrated at 48 and 50 in FIG. 4. This arrangement of the individual blades which form the grooves require a relatively small force for inserting the pipe end into the socket as compared to the greater force required to withdraw the pipe from the socket. The individual blades include an inclined surface 52 and vertical surface 54 arranged such that the cutting edge of the groove is directed towards the medial portion 36 of the sleeve so as to achieve the above action. The cutting edge 56 of the blades is embedded in the outer pipe surface in the illustrated manner.

Figure 3:
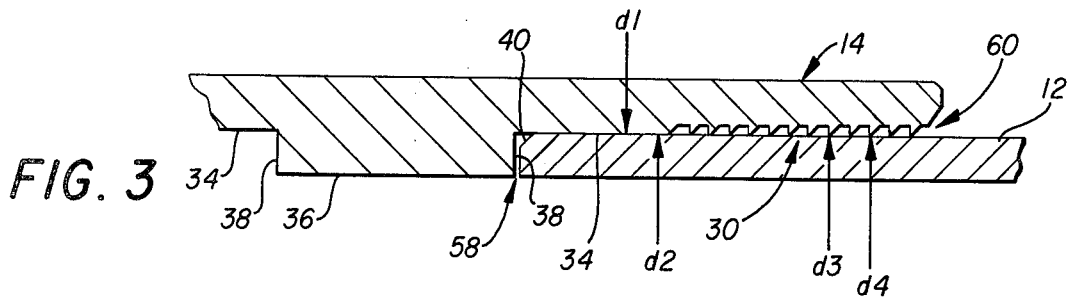
FIG. 3 is an enlarged, fragmented, cross-sectional view of part of the apparatus disclosed in FIG. 2.

In FIG. 3, together with FIG. 4, d1 indicates the outside diameter of the pipe 12, while d2 illustrates the diameter of the smooth bore portion of the socket. The last two diameters are essentially equal to one another so that a tight friction fit is required to force the pipe end into the smooth bore part of the socket. D3 is the diameter measured at the bottom of the grooves, while d4 is the diameter measured across the cutting blades. D4 is smaller than d1 so that the blade 56 is embedded into the surface of the pipe, as seen at 48 and 50, when the sleeve is forced to receive the pipe end.

Figure 5:
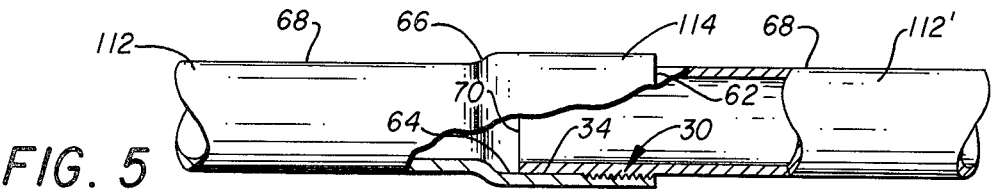

FIG. 5 illustrates another form of the invention wherein one end of a pipe 112 has a coupling member 114 formed integrally thereon. This can be accomplished by welding a cylindrical member 114 thereon before internal coating of the pipe, or alternatively, by expanding the marginal end 114 of the pipe to provide a female cavity 64 which can subsequently be machined into the illustrated socket. Numerals 30 and 34 illustrate the grooved and smooth internal marginal walls of the socket, as in FIG. 2. Numeral 62 indicates the end of socket 64.

The pipe outwardly curves at 66 from diameter 68 to diameter 114 of the socket. Numeral 70 is the end of another pipe joint 112' which likewise has a socket 114 formed at the other end thereof so that the joints of pipe can be series connected together.

In operation, the pipe ends preferably are painted with sealant, such as epoxy resin or a similar cement, and placed within the slips 19 and 22 of hydraulic coupler apparatus 16. Slip 20 is moved towards slip 18 with the sleeve 14 being held in axial alignment therewith. At the same time, slip 22 is rotated respective to slip 19 so that as the marginal pipe ends are received within the opposed sockets of the sleeve, one pipe is twisted approximately 360° respective to the other pipe. This action distributes the sealant in an optimum manner about the coacting surfaces between the pipe and the sleeve, and at the same time facilitates movement of the pipe surface across the grooves 30. The slips at 20 are moved along track 25 until the pipe ends each abut the opposed shoulders 38 of the sleeve.

After the pipe ends have been joined to the sleeve, the resultant pipeline will withstand the bursting strength of the pipe without failure of the connection provided by the sleeve.

The pipe 12 can be standard seamless beveled steel tubular pipe. The sleeve 14 can be fabricated from the next suitable larger size of similar pipe, or alternatively, can be machined from a forging or a casting.

The grooved portion 30 of the socket preferably is slightly tapered so that the inner cutter blades are embedded deeper into the pipe surface as compared to the outer cutter blades.

The present invention avoids the use of mechanical seals, welding, or clamping, and provides a quick and economical means by which joints of a fluid conductor can readily be connected to provide a flow line of any desired length. There is no decision to make regarding which end of the pipe connects to which end of the sleeve because both of the sockets of the sleeve are identical and both of the pipe ends are indentical to one another. There is no high cost involved in preparing the pipe for attachment to the sleeve. The sleeve requires no field preparation or attachments or accessories. The sleeve may be machined from a piece of standard steel tubular pipe with the size being dependent upon the size of the pipe to be joined together.

The grooved portion 30 of the socket preferably comprises a plurality of spaced apart annular cutting surfaces which are continuous for 360°, with the cutting blade being radially disposed inwardly toward the longitudinal center line of the sleeve. The cutting blades are directed inwardly towards one another and the center of the sleeve so that the pipe end more easily is forced into the socket as compared to the forces required for withdrawal of the pipe end from the socket.

The relative diameter d1, d2 can be selected depending upon the bursting strength of the pipe or the anticipated maximum fluid pressures flowing through the pipe line. The smooth bore d2 of the sleeve can be made slightly smaller respective to d1 so that a tremendous friction fit is developed therebetween, or alternatively, can be made slightly larger for ease in fitting one within the other. In a 2 inch seamless tubing, the cutting blades preferably extend outwardly into the pipe surface as seen at 56 in FIG. 4, 10,000 to 30,000ths of an inch, with the blades being spaced about ⅛th inch apart.

As the sleeve is mated to the pipe with a twisting motion, a bond is formed between the pipe joint and the steel coupling sleeve that is greater than the bursting strength of the pipe walls. The present invention is particularly adapted for the joining together of steel tubular members which have previously been internally coated with plastic and the like because none of the coated area is affected with the joining process, and the resultant pipe line therefore has a continuous uninterrupted, undamaged coating. This is especially advantageous where the tubular members have been coated with plastic as seen, for example, in my previous U.S. Pat. No. 4,089,998.

The sleeve 14 can be attached to one joint of pipe 12 prior to shipment to the job site if desired. Moreover, as seen in FIG. 5, it is possible to upset one end 114 of the pipe into a sufficiently large diameter to enable the subsequent formation of a socket 34, 64 therewithin, thereby eliminating the separate sleeve altogether, and providing a unique means by which pipe ends can be joined together by following the teachings of the present invention.

I claim:

1. Method of building a pipeline by joining the marginal ends of adjacent pipe joints to opposed sockets of a pipe sleeve, comprising the steps of:
   (1) selecting a pipe which has a constant diameter marginal end;
   (2) making a pipe sleeve and forming a socket into the pipe sleeve such that the inside diameter of the socket is smaller than the outside diameter of the marginal end of the pipe;
   (3) forming circumferentially extending substantially constant diameter cutters about a first marginal length of the inside wall surface of the socket and forming a smooth bore along a second marginal length of said socket, said smooth bore having an inside diameter which is smaller than the outside diameter of said marginal end of said pipe, so that the marginal end of said pipe is held within the smooth bore of the socket with great friction due to the close tolerance fit therebetween; making the inside diameter of the cutters 0.030-0.080 inches smaller than the outside diameter of the marginal end of the pipe;
   (4) inclining the cutter blades towards a medial part of the pipe sleeve and in a direction away from the pipe;
   (5) arranging the constant diameter marginal end of the pipe in facing relationship respective to the end of the pipe sleeve, with the longitudinal central axis of the pipe and sleeve coinciding with one another;
   (6) applying a sealant to the entire periphery of the marginal end of the pipe; and,
   (7) applying sufficient force to the pipe end and sleeve to force the marginal end of the pipe to move into the socket, whereupon the surface between the marginal end of the pipe and the pipe sleeve are deformed due to the difference in the inside diameter of the cutters and the outside diameter of the pipe.

2. The method of claim 1 wherein step (3) is carried out by selecting the relative size of the cutters and pipe such that the force effected in step (7) causes the cutters to be embedded into the pipe surface 0.010 inches.

3. Improvements in pipelines wherein one constant diameter marginal end of a pipe is joined to another pipe by a connector device;
   said connector device has an axial passageway formed therethrough, a marginal length of said axial passageway is made into a pipe receiving socket;
   a marginal length of said socket includes circumferentially extending constant diameter cutters which are of an inside diameter which is 0.030–0.080 inches smaller than the constant diameter of the marginal end of a pipe to be joined into a pipeline by the connector device;
   said cutters are in the form of a circumferentially extending blade which is increased in thickness in a direction radially away from the axial centerline of the connector device, said blades are inclined towards a medial part of the connector device and in a direction away from the pipe end to be received therewithin;
   said cutters are formed about a first marginal length of the socket to leave a smooth bore along a second marginal length of the socket; said smooth bore has an inside constant diameter which is smaller than the outside diameter of the marginal end of the pipe so that the marginal pipe end is resistingly received therewithin;
   and a sealant is applied to the entire periphery of the marginal end of a pipe, and the pipe end is forced into the socket with sufficient force to deform the surfaces between the marginal end of the pipe and the connector device.

4. The improvement of claim 3 wherein the relative size of the cutters and pipe end causes the cutters to be embedded into the pipe surface at least 0.010 inches.

5. Improvements in pipelines comprising joining one constant diameter marginal end of a pipe to another pipe by the provision of a connector device;
   said connector device has an axial passageway formed therethrough, a marginal length of said axial passageway is made into a pipe receiving socket;
   a marginal length of said socket includes circumferentially extending constant diameter cutters which are of an inside diameter which is 0.030–0.080 inches smaller than the constant diameter marginal end of a pipe to be joined into a pipeline by the connector device;
   said cutters are in the form of a circumferentially extending blade which is increased in thickness in a direction radially away from the axial centerline of the connector device, said blades are inclined towards a medial part of the connectors device and in a direction away from the pipe end to be received therewithin;

so that a pipe end can be forced into the socket with sufficient force to deform the surfaces between the marginal end of the pipe and the connector device;

wherein a sealant is applied to the entire periphery of the marginal end of the pipe;

said cutters are formed about a first marginal length of the socket to leave a smooth bore along a second marginal length of the socket; said smooth bore has an inside constant diameter which is smaller than the outside diameter of the marginal end of the pipe so that the marginal pipe end is resistingly received therewithin;

wherein the relative size of the cutters and pipe end causes the cutters to be embedded into the pipe surface at least 0.010 inches.

* * * * *